(12) United States Patent
Li

(10) Patent No.: US 10,933,310 B2
(45) Date of Patent: Mar. 2, 2021

(54) METHOD AND APPARATUS FOR CONTROLLING VIRTUAL CHARACTER, ELECTRONIC DEVICE, AND STORAGE MEDIUM

(71) Applicant: NETEASE (HANGZHOU) NETWORK CO., LTD., Hangzhou (CN)

(72) Inventor: Xuemei Li, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/124,213

(22) Filed: Sep. 7, 2018

(65) Prior Publication Data

US 2019/0091561 A1    Mar. 28, 2019

(30) Foreign Application Priority Data

Sep. 26, 2017    (CN) .......................... 201710881969.8

(51) Int. Cl.
  *A63F 13/2145*    (2014.01)
  *A63F 13/537*    (2014.01)
  (Continued)

(52) U.S. Cl.
  CPC ........ *A63F 13/2145* (2014.09); *A63F 13/428* (2014.09); *A63F 13/537* (2014.09); *G06F 3/04842* (2013.01); *G06F 3/04883* (2013.01)

(58) Field of Classification Search
  CPC .... A63F 13/04; A63F 13/214; A63F 13/2145; A63F 13/219; A63F 13/426;
  (Continued)

(56) References Cited

U.S. PATENT DOCUMENTS 9,033,797 B1    5/2015 Karpiuk et al.
2010/0069152 A1*    3/2010 Nishimura .............. A63F 13/10
                                                                                    463/31

(Continued)

FOREIGN PATENT DOCUMENTS

CN    104040585 A    9/2014
CN    104516559 A    4/2015
(Continued)

OTHER PUBLICATIONS

"World of Tanks Blitz Android Gamepleay (1080p)" by Zedroid Reviews. Published Nov 14, 2014. Source http://youtube.com/watch?v=KhYI7675lik (Year: 2014).*

(Continued)

*Primary Examiner* — Steven J Hylinski
(74) *Attorney, Agent, or Firm* — Qinghong Xu

(57) ABSTRACT

A method for controlling a virtual character, a apparatus for controlling a virtual character, an electronic device and a computer-readable storage medium, the method including: in response to a first touch operation acted on an aiming control, adjusting a visual field mode of the game scene from a first visual field mode to a second visual field mode; presenting a first shooting control on the GUI under the condition of the second visual field mode, the first shooting control and the aiming control being located at two sides of the GUI, respectively; and in response to a second touch operation acted on the first shooting control, controlling the virtual character to perform a shooting action.

19 Claims, 10 Drawing Sheets

(51) Int. Cl.
*A63F 13/428* (2014.01)
*G06F 3/0488* (2013.01)
*G06F 3/0484* (2013.01)

(58) Field of Classification Search
CPC .............. A63F 13/837; A63F 2300/204; A63F 2300/1068; A63F 2300/8076
See application file for complete search history.

(56) References Cited

U.S. PATENT DOCUMENTS

| | | | | |
|---|---|---|---|---|
| 2013/0288790 | A1* | 10/2013 | Wang | A63F 13/06 463/31 |
| 2013/0326397 | A1* | 12/2013 | Kim | G06F 3/1454 715/781 |
| 2017/0097751 | A1* | 4/2017 | Lee | G06F 3/04812 |
| 2017/0220102 | A1* | 8/2017 | Kim | G06F 9/44 |

FOREIGN PATENT DOCUMENTS

| | | | |
|---|---|---|---|
| CN | 105582670 | A | 5/2016 |
| CN | 105688409 | A * | 6/2016 |
| CN | 105688409 | A | 6/2016 |
| CN | 105498213 | B | 2/2017 |
| CN | 107168611 | A * | 9/2017 |
| CN | 107168611 | A | 9/2017 |
| JP | 2011255119 | A | 12/2011 |
| JP | 5337919 | B1 | 11/2013 |
| JP | 5981617 | B1 | 8/2016 |

OTHER PUBLICATIONS

The CN 1OA issued on Jun. 28, 2018 by CNIPA.
World of Tanks Blitz That real tank game "WoT" came to your smartphone! .
The JP1OA dated Oct. 29, 2019 by the JPO.
The CN4OA dated Feb. 7, 2020 by the CNIPA.

* cited by examiner

METHOD AND APPARATUS FOR CONTROLLING VIRTUAL CHARACTER, ELECTRONIC DEVICE, AND STORAGE MEDIUM

CROSS-REFERENCE

The present invention claims the benefits of Chinese patent application No. 201710381969.8, which was filed with the SIPO on Sep. 26, 2017 and is fully incorporated herein by reference as part of this application.

TECHNICAL FIELD

The present disclosure relates to the field at human computer interaction, and particularly to a method for controlling a virtual character, an apparatus for controlling a virtual character, an electronic device and a computer-readable storage medium.

BACKGROUND

With a rapid development of mobile communication technology, a plenty of video games have been emerged on a terminal device. In various types of shooting games, it usually needs to aim at a virtual character and perform a shooting action.

SUMMARY

According to one aspect of the present disclosure, it provides a method for controlling a virtual character, applied in a touch terminal capable of presenting a graphical user interface (GUI) for a game scene. The method includes: in response to a first touch operation acted on an aiming control, adjusting a visual field mode of the game scene from a first visual field mode to a second visual field mode; under the condition of the second visual field mode, presenting a first shooting control on the GUI, wherein the first Shooting control and the aiming control are located at two sides of the GUI, respectively; and in response to a second touch operation acted on the first shooting control, controlling the virtual character to perform a shooting action.

According to another aspect of the present disclosure, it further provides an apparatus for controlling a virtual character, applied in a touch terminal capable of presenting a graphical user interface (GUI) of a game scene. The device includes: an aiming control component, configured to adjust a visual field mode of the game scene from a first visual field mode to a second visual field mode in response to a first touch operation acted on an aiming control; an interface presenting component, configured to present a first shooting control on the GUI under the condition of the second visual field mode, the first shooting control and the aiming control being located at two sides of the GUI, respectively; and a shooting control component, configured to control the virtual character to perform a shooting action in response to a second touch operation acted on the first shooting control.

According to yet another aspect of the present disclosure, it further provides a computer-readable storage medium stored with a computer program, wherein when the computer program is executed by a processor, the processor is configured to: adjust a visual field mode of the game scene from a first visual field mode to a second visual field mode, in response to a first touch operation acted on an aiming control; present a first shooting control on the GUI under the condition of the second visual field mode, the first shooting control and the aiming control being located at two sides of the GUI, respectively; and control the virtual character to perform a shooting action, in response to a second touch operation acted on the first shooting control.

According to still another aspect of the present disclosure, it further provides an electronic device, including: a processor; and a storage device configured to store an executable instruction of the processor, wherein the processor is configured to perform the method for controlling a virtual character as described above, by executing the executable instructions.

DETAILED DESCRIPTION

Figure 1:
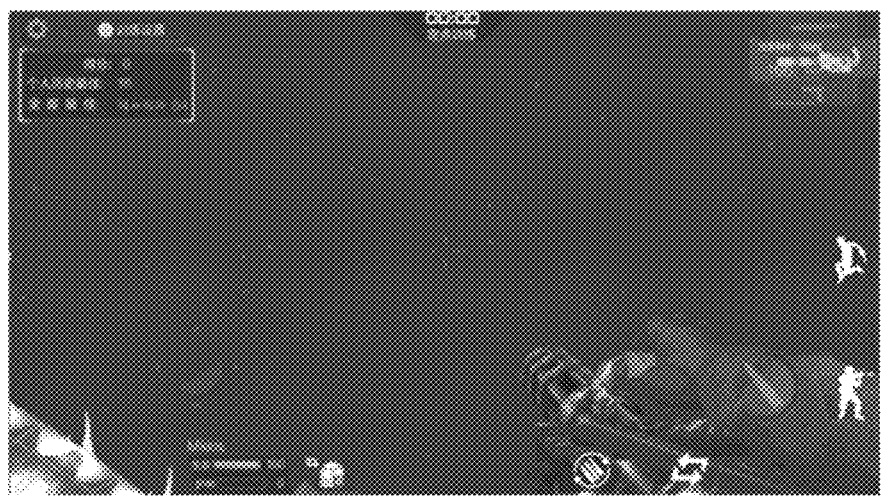
FIG. 1 is a schematic diagram illustrating a GUI of a mobile video game in an illustrative embodiment of the present disclosure.

Illustrative embodiments of the present disclosure will be described more comprehensively with reference to the drawings. However, the illustrative embodiments can be implemented in various forms and are not interpreted in a limited way. On the contrary, these embodiments are provided in order to make the present disclosure comprehensive and complete and to fully convey concept(s) of the illustrative embodiments to those skilled in the art. Similar reference numerals in the drawings indicate the same or similar portions, with repeated description thereof omitted.

In a mobile video game, a position of an aim point of an optical sight is determined by an operation of moving a mouse so as to determine a sight alignment, and then a release of skill or a shooting action is accomplished by clicking mouse. In a mobile shooting video game illustrated in FIG. 1, an aiming action and a shooting action are performed sequentially by a right hand, that is, entering an aiming status may be performed by clicking on a preset region with the right hand, and then adjusting an aiming direction is performed with a swipe operation. Finally, rise the fight hand, click on or touch and hold on the preset region again, so as to perform a firing action or shooting action.

A shake of the optical sight arisen with a shooting action in games and a certain time delay when performing the firing operation may not meet the requirements of a prompt and stable shooting action, when the virtual character is in an intense fighting status. This increases a difficulty in aiming and shooting, thereby resulting in a poor user experience.

An illustrative embodiment of the present disclosure, first of all, discloses a method for controlling a virtual character which can be applied in a touch terminal being capable of presenting a GUI including a game scene for performing a shooting operation. The GUI is available by performing a software application on a processor of the touch terminal and rendering on a display of the touch terminal. In the case where the video game is a first-personal shooting game, the GUI can include a virtual character, an aiming control and a motion control 305; in the case where the video game is a third-personal shooting game, the GUI can further include a virtual character corresponding to a user, and one or more virtual shooting object, wherein the virtual character can be configured to move according to the motion control.

Figure 2:
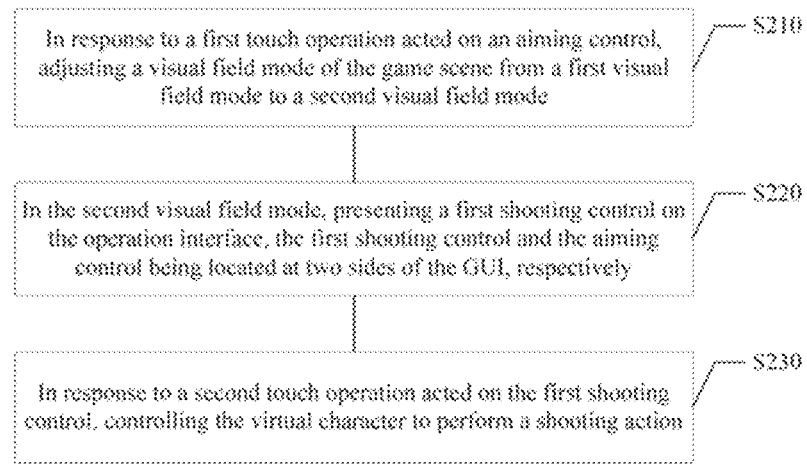
FIG. 2 is a schematic diagram illustrating a method for controlling a virtual character in an illustrative embodiment of the present disclosure.

Additionally, the GUI can further include a virtual fight scene, a virtual natural environment, a map control region, an information panel control region and a blank region located outside these control regions. The virtual character can be represented in various ways, for example, a virtual firearm controlled by a virtual character, etc.; the virtual character can also be a cannon, a mortar and the like, which are controlled by the virtual character. The motion control and the aiming control can be disposed at different sides of the GUI, respectively; for example, the aiming control can be located at any position in a right side of the GUI correspondingly, a motion control can be located at any position in a left side of the GUI. The touch terminal can be various types of electronic devices having a touch such as a mobile phone, a tablet computer, a notebook computer, a game machine and a personal digital assistant (PDA). Referring to FIG. 2, the method for controlling a virtual character can include steps as below.

In step S210, in response to a first touch operation acted on an aiming control, a visual field mode of the game scene is adjusted from a first visual field mode to a second visual field mode.

In step S220, a first shooting control is presented on the GUI under the condition of the second visual field mode, wherein the first shooting control and the aiming control are located at two sides of the GUI, respectively.

In step S230, in response to a second touch operation acted on the first shooting control, the virtual character is controlled to perform a shooting action.

According to the method for controlling a virtual character in the illustrative embodiment of the present disclosure, on one aspect, a user can control a virtual character to perform an aiming action and a shooting action through a cooperation of both hands, by adding a first shooting control on the GUI, which avoids a time delay in the related technology caused by an operation with single hand and allows for more convenient and smoother aiming action and shooting action; on the other hand, it avoids the problem of shaking and shifting during aiming, and meanwhile improves a shooting efficiency because there is no need for lifting a finger before a shooting action.

Hereinafter, steps in the method for controlling a virtual character will be described in further details with reference to FIGS. 2-7.

In step S210, in response to a first touch operation acted on an aiming control, a visual field mode of the game scene is adjusted from a first visual field mode to a second visual field mode.

In the present illustrative embodiment, the aiming control and the motion control mentioned before can be disposed at opposite sides of the GUI, respectively. For example, the aiming control can be located at any position at the right side of the GUI. The first touch operation can be a combination of one or more selected from the group consisted of a click operation, a double click operation, a touch and hold operation and a press-down operation. Herein, description will be given with reference to the case where the first touch operation is a click operation, by way of example. Firstly, it may be detected whether any position on the GUI receives a click operation with a sensor. Then, it may be determined whether the click operation is acted on the aiming control with the sensor. Thirdly, a visual field mode of the game scene is adjusted from a first visual field mode to a second visual field mode basing upon determining that the click operation is acted on the aiming control.

An initial visual field mode of the GUI can be a first visual field mode, and in one embodiment, the first visual field mode can be a full-view visual field allowing for observing a fight scene in all directions. Correspondingly, the terminal may adjust and change a direction of a visual field presented on the GUI according to a touch operation, such as a swipe operation acted on the GUI. The second visual field mode can be a partial-view visual field, which allows for clearly observing a partial scene in a certain scope. When a virtual character needs to aim and shoot at a long-distance virtual shooting object, the terminal can trigger an adjustment of a visual field mode of the game scene from a first visual field mode to a second visual field mode upon a click operation acted on the aiming control, that is the terminal may switch a visual field of the game scene from a full-view visual field to a partial-view visual field, so as to allow the user to perform the shooting operation more accurately.

In the present illustrative embodiment, the step of adjusting a visual field mode of the game scene from a first visual field mode to a second visual field mode can include: adjusting a focal length and a movement of a virtual camera to change the game scene presented on the GUI by a predetermined scale factor and change an optical sight object corresponding to the aiming control by the predetermined scale factor.

In the present illustrative embodiment, in response to a click operation acted on the aiming control, it's also possible to adjust a focal length and a movement of a virtual camera to switch the game scene from a full-view visual field to a partial-view visual field. A lens of the virtual camera can be shortened to change the game scene with a predetermined scale factor. For example, the lens of the virtual camera can be move with a certain deviation value from a starting point, in one embodiment, a current orientation may be set as the starting point, so that the lens can be moved across a shoulder of a corresponding virtual character; at the same time, the focal length of the lens of the virtual camera can be adjusted to change the game scene with a predetermined scale factor. Herein, the predetermined scale factor can be configured by a game designer according to actual demands of the user, for example, the game scene can be changed by 10 times or other scale factors.

Figure 3:
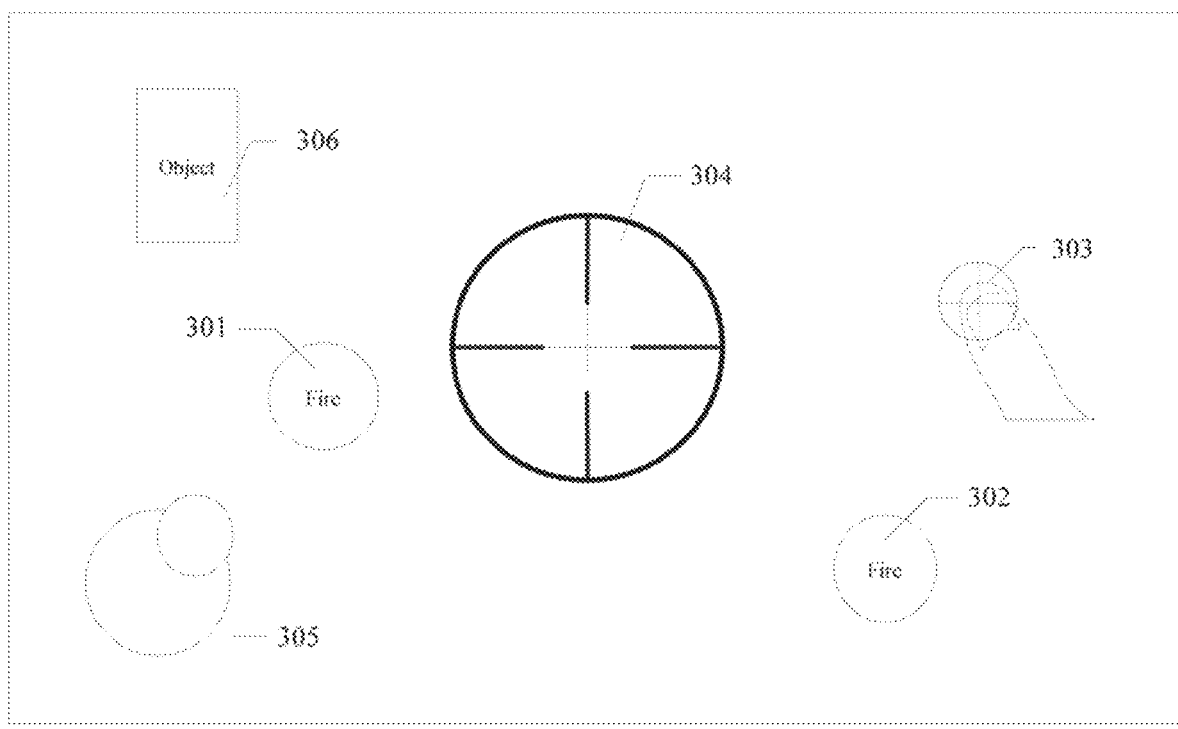
FIG. 3 is a schematic diagram illustrating a GUI in a second visual field mode in an illustrative embodiment of the present disclosure.

At the same time, an optical sight object corresponding to the aiming control can be changed by the predetermined scale factor so as to be matched with the game scene. As illustrated in FIG. 3, the aiming control 303 can be correspondingly changed to become an optical sight object 304, and the optical sight object 304 can be presented at a center of the GUI and can be fixed its position under an aiming status, wherein the center of the GUI may be the physical center, or alternatively, the center of the operation range of the GUI. When the virtual character needs to attack a virtual shooting object 306 at a certain orientation in the game scene, the lens can be shortened to enlarge a screen including the virtual shooting object by a predetermined scale factor so as to perform the aiming action more accurately. When the terminal adjusts the lens of the virtual camera, the lens of the virtual camera can also be controlled to present an animation effect of zooming, so as to indicate the virtual character is under an aiming status, which can enhance a playing experience of the user.

In step S220, a first shooting control is presented on the GUI under the condition of the second visual field mode, the first shooting control and the aiming control being located at two sides of the GUT, respectively.

In the present illustrative embodiment, after entering the second visual field mode as illustrated in FIG. 3, a first shooting control 301 can be provided and presented on the GUI. It should be noted that, the first shooting control 301 herein and the above-mentioned aiming control 303 can be disposed at two sides of the GUI, respectively, so as to control the virtual character to perform the shooting action. For example, the aiming control is presented at a right side of the GUI, and then the first shooting control can be presented at a left side of the GUI, so as to facilitate the user to control an aiming operation and a shooting operation with both hands. The first shooting control can be a touch region which has a visual indication and maintains a clickable status; for example, the first shooting control can be a touch region filled with a color, or a touch region with a preset transparency, or other regions which can visually indicate the range of a touch region.

The first shooting control not only can be presented in a second visual field mode but also can be presented throughout the entire game. In another embodiment, the first shooting control may not be initiated during the game. If the first shooting control is presented throughout the entire game, it may result in too many controls presented on the GUI, because an increase in the number of the controls may lead to a waste of screen space and a possibility of misoperation. If the first shooting control is not initiated, an shooting operation may be as similar as it in a shooting game in the existing technology, and the user may have a frustrating experience. Therefore, in the present embodiment, description will be given with reference to the case where the first shooting control is presented under the condition of the second visual field mode, which can save the screen space to some extent, and increase the coefficient of utilization and improve the operating convenience.

In step S230, in response to a second touch operation acted on the first shooting control, the virtual character is controlled to perform a shooting action.

In the present illustrative embodiment, in response to switching the game scene to the second visual field mode, the virtual character may be controlled to perform the shooting action according to a second touch operation acted on the first shooting control. The second touch operation can be a combination of one or more selected from the group consisted of a click operation, a double click operation, a touch and hold operation and a press-down operation. Herein, description will be given with reference to the case where the second touch operation is a click operation, by way of example. After switching the game scene to the second visual field mode, the terminal controls the virtual character to perform the shooting action as long as it determines that the click operation is acted on the first shooting control with a position sensor.

By way of example, in response to switching the game scene to the second visual field mode, the first shooting control is immediately presented on a preset region at a left side of the GUI. The user only needs to swipe the first shooting control to control an aim point of the virtual character to aim at a target, and to control the virtual character to perform a shooting action just by clicking on any region of the first shooting control.

Additionally, in the present illustrative embodiment, under the condition of the second visual field mode, the method can further include: in response to a swipe operation acted on the aiming control, adjusting an aiming direction of the virtual character according to a moving direction of a touch point of the swipe operation.

In the present illustrative embodiment, in the second visual field mode, an aiming direction of the virtual character can be adjusted according to a moving direction of a touch point of the swipe operation acted on the aiming control. The swipe operation is a continuous operation of the first touch operation. That is, in response to entering the second visual field mode according to the first touch operation acted on the aiming control, an aiming direction of the virtual character may be adjusted and changed by a swipe operation successive to the click operation. When the terminal adjusts the aiming direction of the virtual character, and if it determines a second touch operation acted on the first shooting control, then the virtual character is controlled to perform a shooting action.

Figure 4:
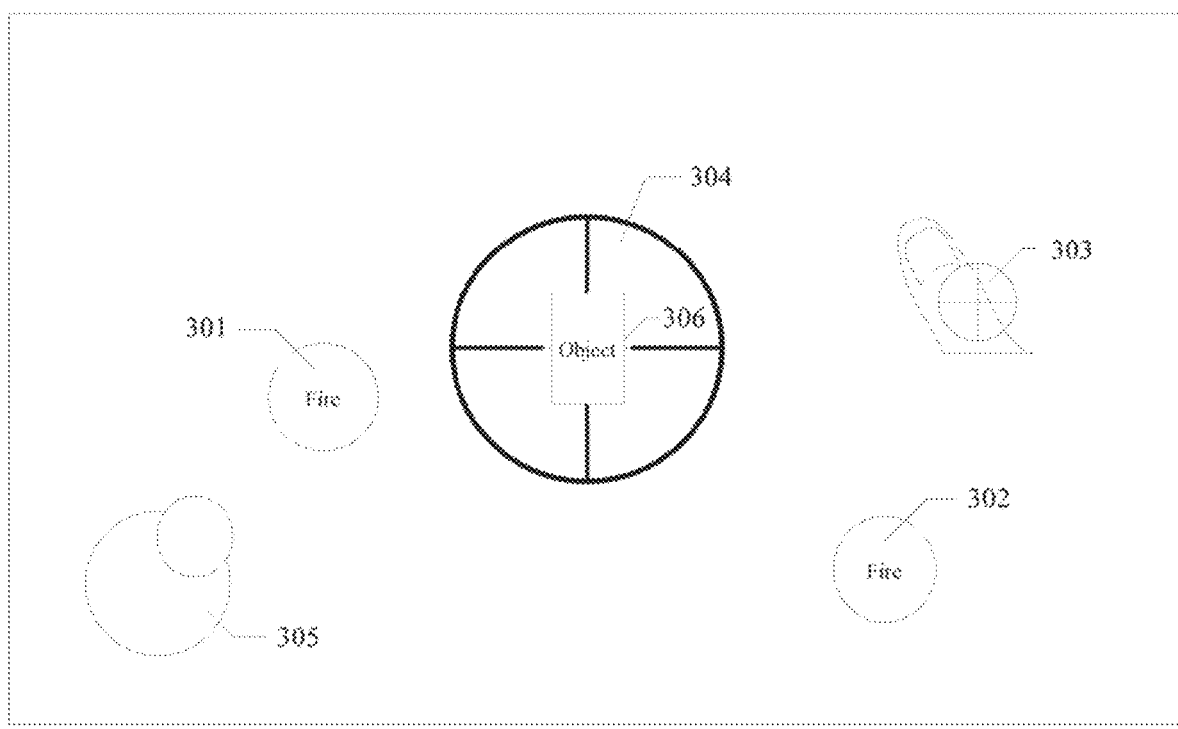
FIG. 4 is a schematic diagram illustrating a GUI of adjusting an aiming direction in an illustrative embodiment of the present disclosure.

By way of example, as illustrated in FIG. 4, the touch point of the swipe operation acted on the aiming control is moved towards 11 o'clock with respect to FIG. 3, thus the aiming direction of the virtual character is also moved from an initial orientation towards 11 o'clock, correspondingly. However, an optical sight object corresponding to the aiming control is fixed at a center of the GUI and kept its position unchanged, so as to achieve a purpose of aiming at the virtual shooting object with an aim point fixed at a central position of the screen. In such a case, in response to a second touch operation acted on the first shooting control, the virtual character is controlled to perform a shooting action.

In the present illustrative embodiment, the step of adjusting an aiming direction of the virtual character can include: obtaining a current position of the touch point of the swipe operation, and determining a moving vector between the current position of the touch point of the swipe operation and a position of the aiming control; and adjusting the aiming direction of the virtual character according to the moving vector between the current position of the touch point of the swipe operation and the position of the aiming control.

In the present illustrative embodiment, it can calculate a moving vector between a current position of the touch point of the swipe operation and a position of the aiming control according to the current position of the touch point of the swipe operation and an initial position of the aiming control. First of all, a coordinate system can be established so as to monitor a swipe operation acted on the aiming control in real time; and then a coordinate of a current position of the touch point of the swipe operation can be obtained and recorded in real time; and then an offset direction and an offset distance of the current position of the touch point of the swipe operation With respect to the initial position of the aiming control can be obtained according to a distance formula. The offset direction and the offset distance of the current position of the touch point of the swipe operation with respect to the initial position of the aiming control can be obtained after the position of the swipe operation have been moved for several times; or, the offset direction and the offset distance of the current position of the touch point can be calculated with respect to a position of the touch point in a last swipe operation.

By way of example, FIG. 4 illustrates a virtual shooting object existed at 11 o'clock with respect to FIG. 3, thus the touch point of the swipe operation acted on the aiming control is also moved towards 11 o'clock; as a result, the aiming direction of the virtual character is also adjusted from an initial orientation towards the 11 o'clock determining the virtual shooting object at 11 o'clock as a targeted, but the optical sight object is fixed at the center of the GUI.

Further, the GUI can further include a second shooting control, and controlling the virtual character to perform a shooting action can include: detecting whether the swipe operation acted on the aiming control is ended or not, under the condition of the second visual field mode; and when the swipe operation acted on the aiming control is detected to be ended, the terminal controls the virtual character to perform a shooting action, in response to a third touch operation acted on the second shooting control.

In the present illustrative embodiment, the GUI in the first visual field mode and the second visual field mode can further include a second shooting control 302. It should be noted that, the first shooting control 301 and the second shooting control 302 in the present illustrative embodiment are located at two sides of the GUI, respectively. For example, a previously provided second shooting control can be located at a same side with the aiming control, and can be always presented on the GUI, while the first shooting control can be disposed at a side opposite to the second shooting control. In the present embodiment, the first shooting control and the motion control are disposed at a left side of the GUI, while the second shooting control and the aiming control are disposed at a right side of the GUI. However, the relative position relationships among those controls are not particularly limited.

After entering the second visual field mode, first of all, the terminal can detect whether the swipe operation acted on the aiming control is ended or not. The swipe operation being ended can be interpreted as an operation of taking a finger off the aiming control. It can detect whether the swipe operation is ended or not by detecting a position or a pressure or other properties of the touch point of the swipe operation.

Additionally, if no swipe operation which is a continuous operation of the first touch operation is detected, that is, if no adjustment of the aiming direction by a swipe operation is existed, then the terminal can determine whether the first touch operation is ended or not. By way of example, when the first touch operation is a click operation, it can determine whether the click operation is ended by detecting whether a touch point is existed on the aiming control, or by calculating a time duration of the first touch operation and determining whether the time duration exceeds a preset time duration, or by detecting a pressure value of the first touch operation and determining whether the pressure value is zero or close to zero. Herein, description will be given with reference to the case where the first touch operation is a click operation, by way of example.

In response to a click operation or a swipe operation acted on the aiming control being ended, controlling the virtual character to perform a shooting action can be achieved by the following ways: detecting a second touch operation acted on the first shooting control and detecting a third touch operation acted on the second shooting control at the same time; only detecting a second touch operation acted on the first shooting control; and only detecting a third touch operation acted on the second shooting control. Herein, the third touch operation can be as same as the first touch operation and the second touch operation, such as a click operation.

Hereinafter, several ways of controlling the virtual character to perform a shooting action above will be described in more details.

Figure 5:
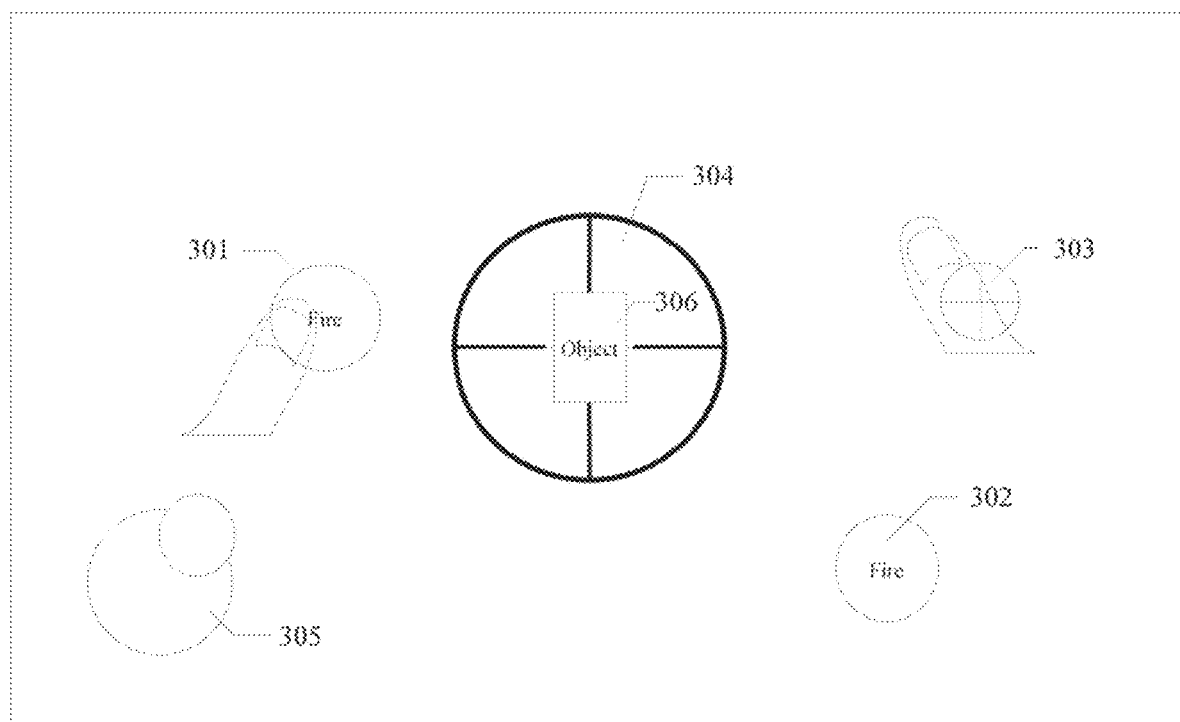
FIG. 5 is a schematic diagram illustrating a GUI of clicking on a left side shooting control for shooting, without taking a right hand off, in an illustrative embodiment of the present disclosure.

As illustrated in FIG. 5, if the terminal only determines a click operation acted on the first shooting control before a click operation or a swipe operation acted on the aiming control is ended, then the terminal directly controls the virtual character to perform a shooting action. In the present illustrative embodiment, if a finger clicking on the aiming control is still on the aiming control, then the finger is unable to click on the second shooting control at the same side of the aiming control to control the virtual character to perform a shooting action. As a result, the shooting action is hindered. In such case, if the terminal detects a click operation acted on the first shooting control located at the other side of the aiming control, then the terminal may control the virtual character to perform a shooting action without releasing the aiming control. With a cooperation of both hands, the operation is more convenient and the game experience is smoother.

Additionally, the present embodiment provides a first shooting control, which allows the user to control the virtual character to perform a shooting operation by directly clicking on the first shooting control at the left side of the GUI while maintaining the tight hand of the user touching and holding the aiming control at the right side of the GUI. In this way, the problem of shaking and shifting during aiming as well as the time delay caused by a shooting operation with a same single hand can be avoided, and allows for a simplified game playing operation, a more stable and accurate shooting action.

Figure 6:
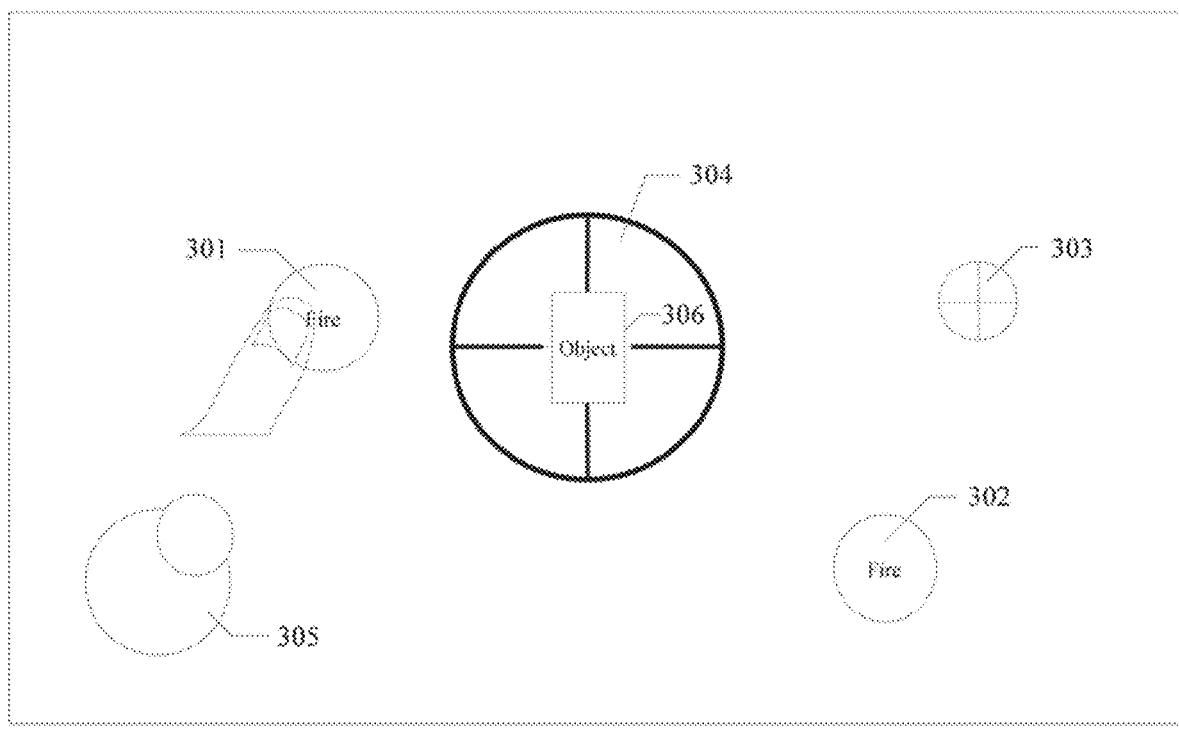
FIG. 6 is a schematic diagram illustrating a GUI of only clicking on the left side, first shooting control for shooting, with taking the right hand off, in an illustrative embodiment of the present disclosure.

Additionally, as illustrated in FIG. 6, if the terminal only determines a click operation acted on the first shooting control or the second shooting control when a click operation or a swipe operation acted on the aiming control is ended, the virtual character is directly controlled to perform a shooting action.

Figure 7:
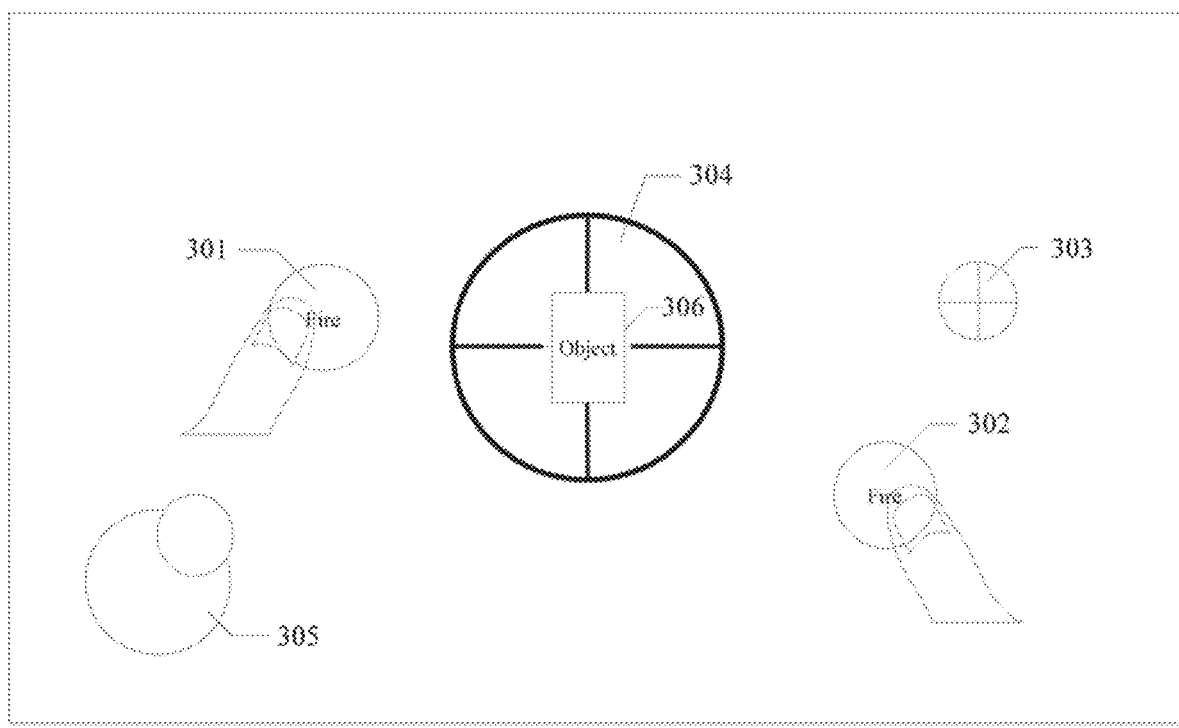
FIG. 7 is a schematic diagram illustrating a GUI of caking on the left side shooting control and a right side shooting control at the same time, in an illustrative embodiment of the present disclosure.

Further, in response to a click operation on both of the first shooting control and the second shooting control at the same time, the virtual character is directly controlled to perform a shooting action. Referring to FIG. 7, after aiming at a virtual shooting object by a swipe operation, the user takes the finger of the right hand off from the GUI, and then clicks on the first shooting control and the second shooting control located at two sides, respectively, at the same time, so as to control the virtual character to fire and shoot. In another embodiment, when the terminal determines high-frequency clicks on the first shooting control and the second shooting control sequentially, the terminal may control the virtual character to perform a high-frequency shooting action, based on the number of guns hold by the virtual character, so as to improve the shooting efficiency and convenience.

Additionally, in order to save the screen space, the method can further include: in response to a fourth touch operation acted on the aiming control in the second visual field mode, restoring the visual field mode of the game scene to the first visual field mode.

In the present illustrative embodiment, in response to switching the game scene from a first visual field mode to a second visual field mode, the process forwards to detect whether the aiming control receives a fourth touch operation. In the present embodiment, the fourth touch operation can be as same as the first touch operation, or can be different from the first touch operation. The fourth touch operation can be a swipe operation, but should be distinguished from the swipe operation for controlling the aiming direction. The present embodiment is described with reference to the case where the fourth touch operation is a click operation, by way of example. If the aiming control receives a click operation under the condition of a first visual field mode, then the terminal controls to switch the game scene from the first visual field mode to the second visual field mode; if the aiming control receives a click operation under the condition of the second visual field mode, then the terminal restores the visual field mode of the game scene to the first visual field mode. In this way, the present embodiment eliminates the need for adding or canceling an aiming control on the GUI, which is simple, convenient and also saves the space.

Further, in the present illustrative embodiment, the method can further include: in response to the visual field mode of the game scene being restored to the first visual field mode, hiding the first shooting control.

In the present illustrative embodiment, the first shooting control can be presented only when the game scene is switched to the second visual field mode, and thus when the game scene is restored to the first visual field mode from the second visual field mode, the first controlling control for aiding in shooting can be hidden correspondingly or not.

Figure 8:
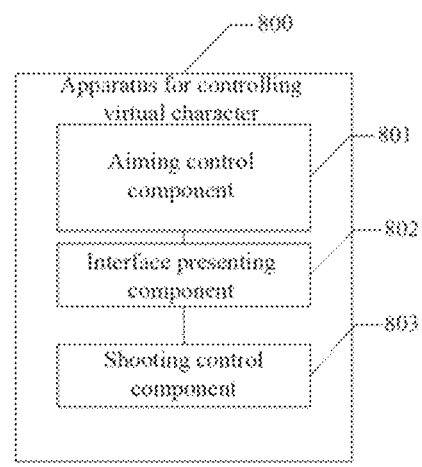
FIG. 8 is a block diagram illustrating an apparatus for controlling a virtual character in an illustrative embodiment of the present disclosure.

An illustrative embodiment of the present disclosure further provides an apparatus for controlling a virtual character. As illustrated in FIG. 8, an apparatus 800 may include: an aiming control component 801, an interface presenting component 802 and a shooting control component 803. The aiming control component 801 may be configured to trigger an adjustment of a visual field mode of the game scene from a first visual field mode to a second visual field mode in response to a first touch operation acted on an aiming control component. The interface presenting component 802 may be configured to present a first shooting control on the GUI under the condition of the second visual field mode. The first shooting control and the aiming control component may be located at two sides of the GUI, respectively. The shooting, control component 803 may be configured to control the virtual character to perform a shooting action in response to a second touch operation acted on the first shooting control.

Specific details of respective components in the above-mentioned apparatus for controlling a virtual character have been particularly described in a corresponding method for controlling a virtual character, and will not be repeated here.

An illustrative embodiment of the present disclosure further provides an electronic device capable of achieving the above-mentioned method.

Those skilled in the art should be appreciated that, various aspects of the present disclosure, can be implemented in a system, a method or a program product. Therefore, various aspects of the present disclosure can be embodied in the following ways: pure hardware implementation, pure software implementation (including firmware, microcode and the like), or a combination implementation of software and hardware, which are all referred to as a circuit, a component or a system herein.

Hereinafter, an electronic device 900 according to this implementation of the present disclosure is described with reference to FIG. 9. The electronic device 900 as illustrated in FIG. 9 merely is an exemplary embodiment, function(s) and application range(s) of the embodiment(s) of the present disclosure should not be limited thereto in any way.

Figure 9:
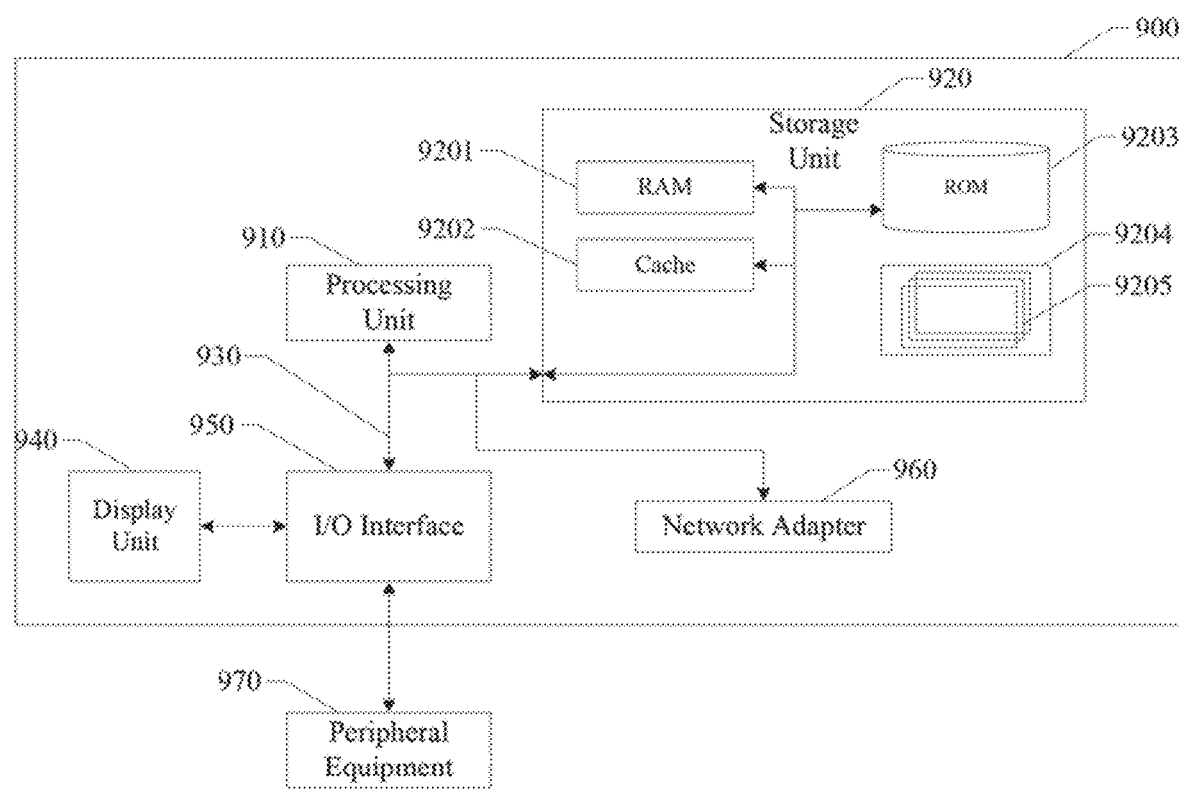
FIG. 9 is a block diagram illustrating an electronic device in an illustrative embodiment of the present disclosure.

As illustrated in FIG. 9, the electronic device 900 can be represented in the form of a general-purpose computing device. Components of the electronic device 900 can include but are not limited to, at least one of the above-mentioned processing unit 910, at least one of the above-mentioned storage unit 920, a bus 930 connecting different system components (including the storage unit 920 and the processing unit 910), and a display unit 940.

The storage unit is stored with program codes executable by the processing unit 910 to cause the processing unit 910 to perform steps(s) according to various illustrative embodiments described in the "illustrative method" portion of the present specification. For example, the processing unit 910 can perform the step(s) illustrated in FIG. 2.

The storage unit 920 can include a readable medium in the form of a volatile storage unit such as a random access memory (RAM) unit 9201 and/or a cache memory unit 9202, and can further include a read only memory (ROM) unit 9203.

The storage unit 920 can further include a program/utility tool 9204 having a group of (at least one) program component 9205. Such program component 9205 includes, but is not limited to, an operation system, one or more application program, other program component(s) and program data. Any one or combination of these examples can include an implementation of network environment.

The bus 930 can be represented by one or more of several types of bus structures, including a storage unit bus or a storage unit controller, a peripheral bus, an accelerated graphics port, a processing unit or a local bus utilizing any bus structure among several types of bus structures.

The electronic device 900 can also be communicated with one or more peripheral equipment 970 (e.g., keyboard, pointing device, Bluetooth device and the like), and can also be communicated with a device which allows a user to interact with the electronic device 900 and/or a device which allows the electronic device 900 to communicate with one or more other computing device (e.g., router, modem and the like). Such communication can be implemented through an input/output (I/O) interface 950. Furthermore, the electronic device 960 can also be communicated with one or more network (e.g., LAN, WAN and/or public network such as Internet) through a network adapter (NA) 960. As illustrated, the NA 960 can be communicated with other module(s) of the electronic device 900 through the bus 930. It should be understood that, although not illustrated, other hardware and/or software component(s) can be used in combination with the electronic device 900, including, but not limited to, a microcode, a device driver, a redundant processing unit, an external disk drive array, a RAID system, a magnetic tape driver and a data backup storage system, etc.

From the description of the embodiments above, those skilled in the art should be readily appreciated that, the illustrative embodiment(s) described herein can be implemented in the form of software, can also be implemented in the form of software combined with necessary hardware. Therefore, technical solution(s) according to embodiment(s) of the present disclosure can be embodied in the form of software product which can be stored in a nonvolatile storage medium (e.g., CD-ROM, USB flash disk, mobile hard disk, etc.) or in a network, including several instructions allowing a computing device (e.g., personal computer, server, terminal device or network device) to perform the method according to the embodiment(s) of the present disclosure.

An illustrative embodiment of the present disclosure further provides a computer-readable storage medium stored with a program product capable of implementing the above-mentioned method of the present specification. In some possible implementations, various aspects of the present disclosure can be implemented in the form of a program product including program codes which are configured to, when the program product is run on a terminal device, the terminal device will perform the steps(s) according to various illustrative embodiments described in the "illustrative method" portion of the present specification.

Figure 10:
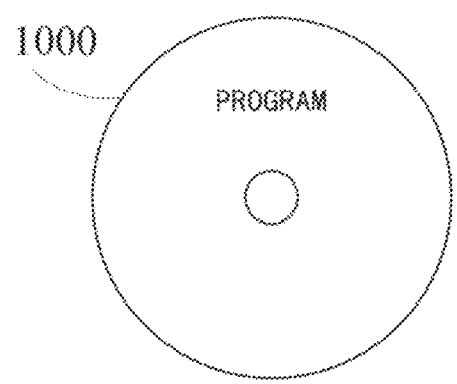
FIG. 10 is a schematic diagram illustrating a program product in an illustrative embodiment of the present disclosure.

Referring to FIG. 10 illustrating a program product 1000 configured to implement the above-mentioned method according to an implementation of the present disclosure. The program product 1000 can adopt a portable compact disk read only memory (CD-ROM) including program codes and can be executed on a terminal device such as a personal computer. However, the program product of the present disclosure is not limited thereto. In the present disclosure, the ROM medium can be any tangible medium containing or storing a program which can be utilized by an instruction execution system, apparatus or device, or utilized in combination there-with.

The program product can adopt any combination of one or more readable medium. The readable medium can be a readable signal transmission medium or a readable storage medium. The readable storage medium, for example, can be but is not limited to an electric, magnetic, optical, electro-magnetic, infrared or semi-conductive system, apparatus or device, or a combination thereof. A more specific example (not a list of exhaustion) of the readable storage medium includes: an electric connection with one or more guide lines, a portable disk, a hard disk, a random access memory (RAM), a read only memory (ROM), an erasable programmable read only memory (EPROM or flash disk), an optical fiber, a portable compact disk read only memory (CD-ROM), an optical memory, a magnetic memory or any appropriate combination of the above.

The computer-readable signal transmission medium can include a data signal propagating in a baseband or propagating as a part of a carrier wave, the data signal carries a readable program code. Such propagating data signal can adopt a plurality of forms, including but not limited to electromagnetic signal, optical signal or any appropriate combination of the above. The readable signal transmission medium can also be any readable medium except a readable storage medium, which can send, propagate or transmit a program configured to be utilized by an instruction execution system, apparatus or device or utilized in combination there-with.

The program code contained in the readable medium can be transmitted through any appropriate medium, including but not limited to, wireless medium, wired medium, optical cable, radio frequency (RF), etc., or any appropriate combination of the above.

The program code capable of implementing operation(s) in the present disclosure can be written in one or more programming language or any combination thereof. The programming language includes an object-oriented programming language such as Java and C++, and also includes a conventional procedural programming language such as C-language or similar programming language. The program code can be completely executed on a client computing device, partly executed on a client computing device, executed as an independent software package, partly executed on a client computing device while partly executed on a remote computing device, or completely executed on a remote computing device or server In the case involving a remote computing device, the remote computing device can be connected to the user computing device through any type of network, including LAN and WAN; or can be connected to an external computing device (e.g., through the Internet by utilizing an Internet service provider).

Additionally, the drawings above are merely illustrative explanations of processes included in the method according to the illustrative embodiments of the present disclosure but nor for purpose of limitation. It's readily understood that, the processes illustrated in the drawings above are not intended to indicate or define any time sequence of these processes. Moreover, it's also readily understood that, these processes can also be performed in several components synchronously or asynchronously.

It should be noted that, although several components or units for executing actions have been mentioned in the detailed description above, such division is not intended to be compulsory. Actually, according to the implementation(s) of the present disclosure, feature(s) and function(s) of one or more components or units described above can be embodied in a single component or unit. On the contrary, feature(s) and function(s) of one or more components or units described above can be embodied by being further divided into multiple components or units.

Those skilled in the art, by considering the present specification and practicing the disclosure herein, will readily conceive of other embodiment(s) of the present disclosure. The present disclosure is intended to cover any variation, purpose or adaptive modification which is in accordance with general principle(s) of the present disclosure and to encompass well-known knowledge or conventional technical means in the art which is not disclosed in the present disclosure. The specification and the embodiments are merely deemed as illustrative, and the true scope and inspirit of the present disclosure are indicated by the appended claims.

It should be appreciated that, the present disclosure is not intended to be limited to any exact structure described above or illustrated in the drawings, and can be modified and changed without departing from the scope thereof. The scope of the present disclosure is defined by the appended claims.

What is claimed is:

1. A method for controlling a virtual character, applied in a touch terminal capable of presenting a graphical user interface (GUI) for a game scene, the method comprising:
    adjusting a visual field mode of the game scene from a first visual field mode to a second visual field mode, in response to a first touch operation acted on an aiming control;
    under the condition of the second visual field mode, presenting a first shooting control on the GUI, wherein the first shooting control and the aiming control are located at two sides of the GUI, respectively;
    controlling the virtual character to perform a shooting action, in response to a second touch operation acted on the first shooting control, and hiding the first shooting control, in response to the visual field mode of the game scene being restored to the first visual field mode.

2. The method for controlling a virtual character according to claim 1, wherein adjusting a visual field mode of the game scene from a first visual field mode to a second visual field mode comprises:
adjusting a focal length and a movement of a virtual camera to change the game scene by a predetermined scale factor and change an optical sight object corresponding to the aiming control by the predetermined scale factor.

3. The method for controlling a virtual character according to claim 1, wherein the swipe operation is a continuous operation of the first touch operation.

4. The method for controlling a virtual character according to claim 1, wherein the adjusting an aiming direction of the virtual character comprises:
obtaining a current position of the touch point of the swipe operation, and determining a moving vector between the current position of the touch point of the swipe operation and a position of the aiming control; and
adjusting the aiming direction of the virtual character according to the moving vector between the current position of the touch point of the swipe operation and the position of the aiming control.

5. The method for controlling a virtual character according to claim 4, wherein the position of the aiming control is an initial position of the aiming control.

6. The method for controlling a virtual character according to claim 4, wherein the moving vector includes an offset direction and an offset distance.

7. The method for controlling a virtual character according to claim 1, further comprising:
restoring the visual field mode of the game scene to the first visual field mode in response to a fourth touch operation acted on the aiming control under the condition of the second visual field mode.

8. The method for controlling a virtual character according to claim 1, wherein the first shooting control and the second shooting control are located at two sides of the GUI, respectively.

9. The method for controlling a virtual character according to claim 1, wherein the GUI further comprises a second shooting control, and the method further comprises controlling the virtual character to perform a shooting action in response to determining a touch operation on both of the first shooting control and the second shooting control at the same time.

10. An electronic device, comprising:
a processor; and
a storage device configured to store an executable instruction of the processor, wherein the processor is configured to perform the method for controlling a virtual character according to claim 1 by executing the executable instructions.

11. The method for controlling a virtual character according to claim 1, further comprising, under the condition of the second visual field mode,
adjusting an aiming direction of the virtual character according to a moving direction of a touch point of the swipe operation, in response to a swipe operation acted on the aiming control.

12. The method for controlling a virtual character according to claim 1, wherein the GUI further comprises a second shooting control, and the controlling the virtual character to perform a shooting action comprises:
detecting whether the swipe operation acted on the aiming control is ended or not, under the condition of the second visual field mode; and controlling the virtual character to perform a shooting action, in response to a third touch operation acted on the second shooting control, when the swipe operation is determined to be ended.

13. An apparatus for controlling a virtual character, applied in a touch terminal capable of presenting a graphical user interface (GUI) of a game scene, comprising:
an aiming control component, configured to adjust a visual field mode of the game scene from a first visual field mode to a second visual field mode in response to a first touch operation acted on an aiming control;
an interface presenting component, configured to present a first shooting control on the GUI under the condition of the second visual field mode, the first shooting control and the aiming control being located at two sides of the GUI, respectively; and
a shooting control component, configured to control the virtual character to perform a shooting action in response to a second touch operation acted on the first shooting control,
wherein the first shooting control is hidden in response to the visual field mode of the game scene being restored to the first visual field mode.

14. A computer-readable storage medium stored with a computer program, wherein when the computer program is executed by a processor, the processor is configured to:
adjust a visual field mode of the game scene from a first visual field mode to a second visual field mode, in response to a first touch operation acted on an aiming control;
under the condition of the second visual field mode, present a first shooting control on the GUI in the second visual field mode, the first shooting control and the aiming control being located at two sides of the GUI, respectively;
control the virtual character to perform a shooting action, in response to a second touch operation acted on the first shooting control, and
hide the first shooting control, in response to the visual field mode of the game scene being restored to the first visual field mode.

15. The computer-readable storage medium according to claim 14, wherein the processor is further configured to:
adjust a focal length and a movement of a virtual camera to change the game scene presented on the GUI by a predetermined scale factor and change an optical sight object corresponding to the aiming control by the predetermined scale factor.

16. The computer-readable storage medium according to claim 13, wherein the swipe operation is a continuous operation of the first touch operation.

17. The computer-readable storage medium according to claim 13, wherein the processor is further configured to:
obtain a current position of the touch point of the swipe operation, and calculate a moving vector between the current position of the touch point of the swipe operation and a position of the aiming control; and
adjust the aiming direction of the virtual character according to the moving vector between the current position of the touch point of the swipe operation and the position of the aiming control.

18. The computer-readable storage medium according to claim 14, wherein the processor is further configured to:
under the condition of the second visual field mode, adjust an aiming direction of the virtual character according to a moving direction of a touch point of a swipe operation, in response to the swipe operation acted on the aiming control.

19. The computer-readable storage medium according to claim 14, wherein the GUI further comprises a second shooting control, the processor is further configured to:

detect whether the swipe operation acted on the aiming control is ended or not under the condition of the second visual field mode; and control the virtual character to perform a shooting action, in response to a third touch operation acted on the second shooting control, when the swipe operation acted on the aiming control is detected to be ended.

* * * * *